(12) United States Patent
Duncan et al.

(10) Patent No.: US 9,633,165 B1
(45) Date of Patent: Apr. 25, 2017

(54) COMPOSITE DESIGN DIRECTION

(71) Applicant: Exa Corporation, Burlington, MA (US)

(72) Inventors: Brad Duncan, Lexintgon, MA (US); Andrea Shestopalov, Billerica, MA (US)

(73) Assignee: Exa Corporation, Burlington, MA (US)

( * ) Notice: Subject to any disclaimer, the term of this patent is extended or adjusted under 35 U.S.C. 154(b) by 0 days.

(21) Appl. No.: 15/058,398

(22) Filed: Mar. 2, 2016

Related U.S. Application Data

(60) Provisional application No. 62/387,304, filed on Dec. 23, 2015.

(51) Int. Cl.
*G06G 7/48* (2006.01)
*G06F 17/50* (2006.01)
*G06F 17/16* (2006.01)

(52) U.S. Cl.
CPC .......... *G06F 17/5095* (2013.01); *G06F 17/16* (2013.01); *G06F 17/5009* (2013.01)

(58) Field of Classification Search
CPC ............. G06F 17/5009; G06F 17/5095; G06F 17/5018; G06B 19/4097; E21B 43/00; E21B 10/60; H01M 8/0206; G06K 9/00214
See application file for complete search history.

(56) References Cited

U.S. PATENT DOCUMENTS

| | | | | |
|---|---|---|---|---|
| 7,831,418 | B1* | 11/2010 | Sendhoff | G06F 17/5095 700/29 |
| 8,725,470 | B1* | 5/2014 | Brown | G06F 17/5009 703/2 |
| 2006/0076163 | A1* | 4/2006 | Terracina | E21B 10/60 175/393 |

(Continued)

OTHER PUBLICATIONS

Castro et al., "Modelling and simulation in reactive polymer processing", Modelling and Simulation in Materials Science and Engineering, 2004.*

(Continued)

*Primary Examiner* — Kandasamy Thangavelu
(74) *Attorney, Agent, or Firm* — Fish & Richardson P.C.

(57) ABSTRACT

Methods, systems, and apparatus, including computer programs encoded on computer storage media, for processing data in a data processing system to identify candidate modifications to physical features of a mechanical device. One of the methods includes converting a representation of the mechanical device into a representation of surface elements. The method includes that based on the representation of the surface elements, computing an effect to evaluation criteria of each of a design variable. The method includes converting the design variables and the computed effect into component vectors. The method includes computing a composite design vector for the evaluation criteria using the component vectors, with the composite design vector comprising a combination of design variable settings to improve (Continued)

the evaluation criteria, and specifying a vector in a design variable space. The method also includes generating a physical modification specification for the mechanical device based on the composite design vector.

27 Claims, 5 Drawing Sheets

(56) References Cited

U.S. PATENT DOCUMENTS

| | | | |
|---|---|---|---|
| 2009/0187388 A1* | 7/2009 | Shu | G06K 9/00214 |
| | | | 703/2 |
| 2011/0011595 A1* | 1/2011 | Huang | E21B 43/00 |
| | | | 166/369 |
| 2011/0112800 A1* | 5/2011 | Kim | G06F 17/5018 |
| | | | 703/1 |
| 2012/0253757 A1* | 10/2012 | Kobayashi | G06F 17/5009 |
| | | | 703/2 |
| 2013/0074318 A1* | 3/2013 | Xu | H01M 8/0206 |
| | | | 29/592 |
| 2014/0257543 A1* | 9/2014 | Rhodes | G05B 19/4097 |
| | | | 700/97 |

OTHER PUBLICATIONS

Collard, J.F., "Geometrical and Kinematic Optimization of closed-Loop Multibody Systems", Université Catholique de Louvain, 2007.*

Scott, M.J,, "A Comparison of Design Evaluation Techniques", California Institute of Technology, 1998.*

International Search Report and Written Opinion; PCT/US16/67496; Jan. 23, 2017; 13 pages.

* cited by examiner

COMPOSITE DESIGN DIRECTION

CLAIM OF PRIORITY

This application claims priority under 35 USC §119(e) to U.S. Provisional Patent Application Ser. No. 62/387,304, filed on Dec. 23, 2015 and entitled "COMPOSITE DESIGN DIRECTION," the entire contents of which are hereby incorporated by reference.

BACKGROUND

Fluid dynamics addresses fluids (liquids and gases) in motion. Fluid dynamics can include the study of aerodynamics (the study of air and other gases in motion) and hydrodynamics (the study of liquids in motion). Fluid dynamics has a wide range of applications, including calculating forces and moments on aircraft, determining the mass flow rate of petroleum through pipelines, predicting weather patterns, understanding nebulae in interstellar space and modeling fission weapon detonation.

SUMMARY

Aspect 1 of the subject matter described in this specification can be embodied in methods that include converting a representation of the mechanical device into a representation of one or more surface elements. In aspect 1, the methods include that based on the representation of the plurality of surface elements, computing an effect to one or more evaluation criteria of the mechanical device of each of a plurality of design variables, each design variable describing an alteration to the representation of the mechanical device. In aspect 1, the methods include converting the design variables and data indicative of the computed effect into component vectors. In aspect 1, the methods include computing a composite design vector for the one or more evaluation criteria using the component vectors, with the composite design vector comprising a combination of design variable settings to improve the one or more evaluation criteria, and specifying a vector in a design variable space. In aspect 1, the methods also include generating a physical modification specification for the mechanical device based on the composite design vector.

The foregoing and other embodiments can each optionally include one or more of the following features, alone or in combination.

In aspect 2 according to aspect 1, the alteration to the design for each design variable may identify a morphing feature.

In aspect 3 according to any of aspects 1 and 2, converting the design variables and the calculated effects into component vectors may include performing a principle coordinate analysis.

In aspect 4 according to any of aspects 1, 2, and 3, the evaluation criteria may include at least one of drag and lift.

In aspect 5 according to any of aspects 1, 2, 3, and 4, the design alterations may be limited by the ranges corresponding to the design variables.

In aspect 6 according to any of aspects 1, 2, 3, 4 and 5, altering the design may include performing a shape modification using a parameterized morphing technique.

In aspect 7 according to any of aspects 1, 2, 3, 4, 5, and 6, the morphing features may include displacements normal to the surface of the design.

In aspect 8 according to any of aspects 1, 2, 3, 4, 5, 6, and 7, calculating the effect of each design variable may include automatically simulating an effect to an evaluation criteria of the mechanical device of each of a plurality of design variables over a chosen range, determining the effect of each design variable based on the simulation, and creating a response surface of the evaluation criteria for the design based on the simulation.

In aspect 9 according to any of aspects 1, 2, 3, 4, 5, 6, 7, and 8, the method may include altering a range corresponding to at least one design variable, and re-computing the composite design vector based on the altered range, without re-simulating fluid flow over the design.

In aspect 10 according to any of aspects 1, 2, 3, 4, 5, 6, 7, 8, and 9, computing the composite design vector may include constraints on one or more of the design variables.

In aspect 11 according to any of aspects 1, 2, 3, 4, 5, 6, 7, 8, 9, and 10, computing the composite design vector may include weights and/or constraints on one or more of the evaluation criteria.

In aspect 12 according to any of aspects 1, 2, 3, 4, 5, 6, 7, 8, 9, 10, and 11, computing the composite design vector may include computing separate composite design vectors for each of one or more evaluation criteria in the evaluation criteria.

In aspect 13 according to any of aspects 1, 2, 3, 4, 5, 6, 7, 8, 9, 10, 11, and 12, computing the composite design vector may include computing a single composite design vector for the combined evaluation criteria.

In aspect 14 according to any of aspects 1, 2, 3, 4, 5, 6, 7, 8, 9, 10, 11, 12, and 13, the physical modification specification includes proposed modifications to the mechanical device.

Aspect 15 of the subject matter described in this specification can be embodied in methods that include determining an effect of each of a plurality of design variables on one or more evaluation criteria, each design variable describing an alteration to the geometry of the mechanical device. The methods include comparing the importance of the design variables based on the determined effects on the one or more evaluation criteria. The methods include computing the composite design vector, which comprises a combination of design variable settings to increase the performance of the one or more evaluation criteria, relative to the performance of the one or more evaluation criteria at other design variable settings, wherein vector identifies a vector in the design variable space. The methods include generating a physical modification specification to the mechanical device based on the composite design vector.

In aspect 16 according to aspect 15 the alteration to the design for each design variable may identify a morphing feature.

In aspect 17 according to any of aspects 15 and 16, comparing the importance of the design variables may include comparing the impact of changes to design variables settings on the one or more evaluation criteria.

In aspect 18 according to any of aspects 15, 16, and 17, the one or more evaluation criteria may include at least one of drag and lift.

In aspect 19 according to any of aspects 15, 16, 17, and 18, generating the physical modification specification may be limited by a range associated with at least one of the design variables.

In aspect 20 according to any of aspects 15, 16, 17, 18, and 19, generating a physical modification specification may include performing a shape modification using a parameterized morphing technique.

In aspect 21 according to any of aspects 15, 16, 17, 18, 19, and 20, the morphing features may include displacements normal to the surface of the mechanical device.

In aspect 22 according to any of aspects 15, 16, 17, 18, 19, 20, and 21, determining the effect of each of the plurality of design variables may include simulating fluid flow over the device for each design variable applied over a chosen range, determining the effect of each design variable based on the simulation, and creating a response surface of the evaluation criteria based on the simulation.

In aspect 23 according to any of aspects 15, 16, 17, 18, 19, 20, 21, and 22, the methods may include altering a range corresponding to at least one design variable, and re-computing the composite design vector based on the altered range, without re-simulating fluid flow over the design.

In aspect 24 according to any of aspects 15, 16, 17, 18, 19, 20, 21, 22, and 23, computing the composite design vector may include constraints on one or more of the design variables.

In aspect 25 according to any of aspects 15, 16, 17, 18, 19, 20, 21, 22, 23, and 24, computing the composite design vector may include at least one of weights and constraints on one or more of the evaluation criteria.

In aspect 26 according to any of aspects 1, 2, 3, 4, 5, 6, 7, 8, 9, 10, 11, 12, 13, 14, 15, 16, 17, 18, 19, 20, 21, 22, 23, 24, and 25, computing the composite design vector may result in a separate composite design vector for each of one or more evaluation criteria in the evaluation criteria.

In aspect 27 according to any of aspects 1, 2, 3, 4, 5, 6, 7, 8, 9, 10, 11, 12, 13, 14, 15, 16, 17, 18, 19, 20, 21, 22, 23, 24, and 25, computing the composite design vector results in a single composite design vector for the combined evaluation criteria.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The embodiments described below can provide one or more of the following advantages. Information may be presented in an easily understood format. The processing power required to change the design may be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Lattice Boltzmann-based physics simulations can be used to study and recommend modifications to a design in order to improve the fluid dynamic characteristics of the underlying device. The analysis can be used to improve an existing device or may be performed prior to building a prototype. Among other features, the simulation can determine factors such as aerodynamics (for example, aerodynamic efficiency; vehicle handling; soiling and water management; panel deformation; driving dynamics), aeroacoustics (for example, greenhouse wind noise; underbody wind noise; gap/seal noise; mirror, whistle and tonal noise; sunroof and window buffeting; pass-by/community noise; cooling fan noise), thermal management (for example, cooling airflow; thermal protection; brake cooling; drive cycle simulation; key-off and soak; electronics and battery cooling; RoA/intake ports), climate control (for example, cabin comfort; HVAC unit & distribution system performance; HVAC system and fan noise; defrost and demist), and powertrain (for example, drivetrain cooling; exhaust systems; cooling jacket; engine block).

Figure 1:
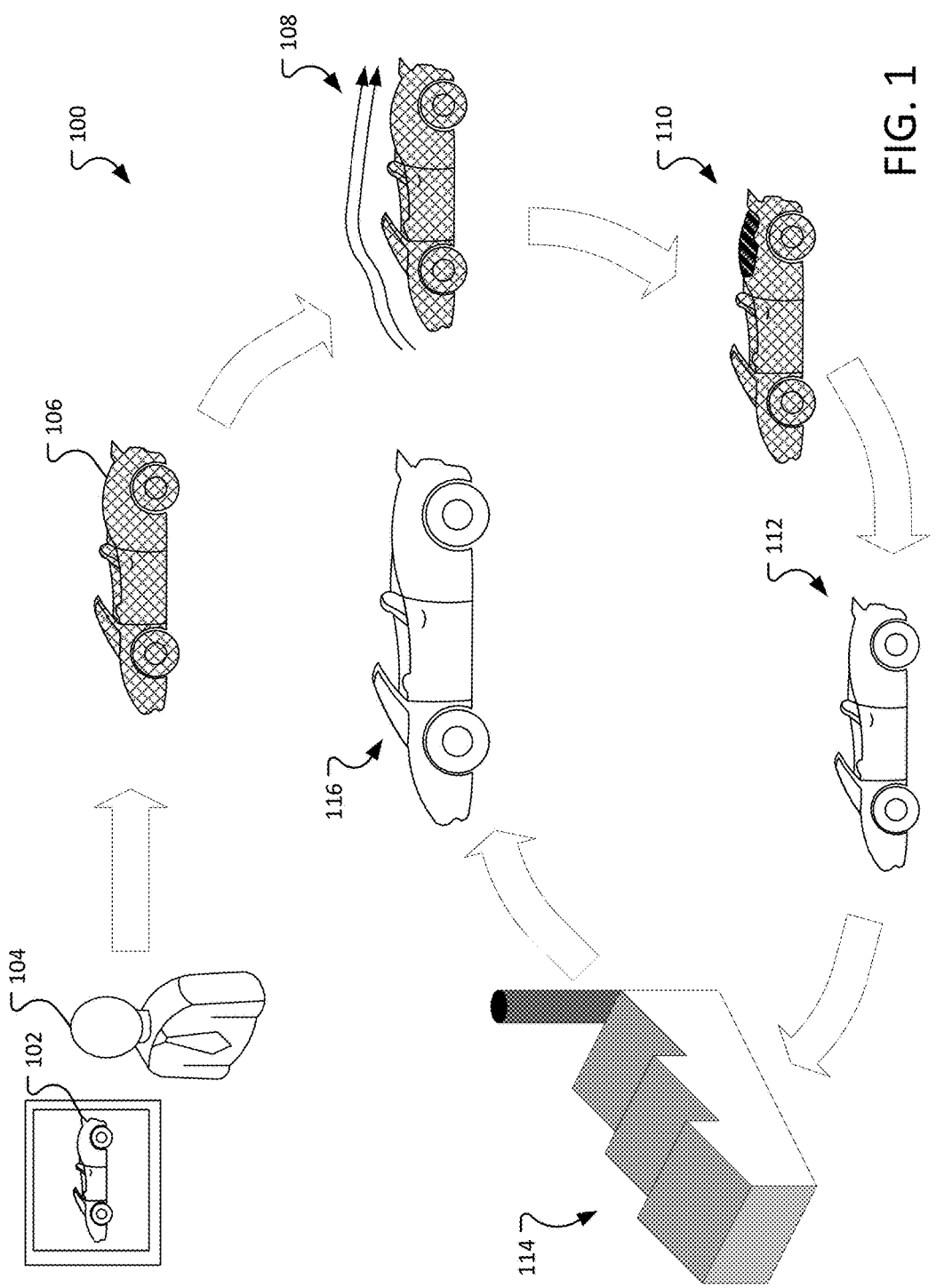
FIG. 1 illustrates an example of a development process using design analysis.

FIG. 1 illustrates an example of a development process 100 using design analysis. The process described in FIG. 1 provides an overview of the process, the details of the process is further described in subsequent figures. In this example, a designer 104 reviews the design of a mechanical device (in this example, the automobile 102). In some scenarios, the design may be for an automobile or other mechanical device that is currently in existence and is to be modified. In other scenarios, the design can be for a planned device that is in the prototyping stage of development. The designer 104 or other individual may identify areas of the design that may be modified (referred to herein as design variables). Design variables can refer to different parts of the geometry of the mechanical device that can be modified. For example, design variables can include dimensions of the vehicle, or of a part of the vehicle (such as the length of the rear windshield), curves or slopes of the geometry (such as the angle between the front hood and the windshield), etc. A range can be assigned to each design variable. In some implementations, a design variable may correspond to a morph point in a design space, as discussed further below. The range can specify how much the designer or other individual is willing to alter the design.

The designer or other individual may also specify one or more evaluation criteria. For example, the design of the mechanical device may be analyzed in order to improve drag, lift (front or rear), acoustics, or any other criteria that can be determined using the simulation processes described herein.

The design for the mechanical device may be transformed into a geometric representation 106 of the mechanical device. In this example, the geometric representation is illustrated by a cross-hatching of the mechanical device. The geometric representation may be, for example, a geometric representation of the surface of the mechanical device (such as a triangular surface mesh or other geometric representation). In some implementations, the geometric representation may include identifying morphing features that correspond to one or more of the design variables.

A simulation 106 can be performed using the geometric representation 106 of the mechanical device. The simulation can be applied including morphing the geometry according to the design variables and the predetermined ranges. The simulation can measure the effect of the changes on the evaluation criteria over a variety of different values for the design variables (as determined by the ranges).

Once the simulation 106 is complete, a system can identify 110 areas of the geometry that can be modified to improve the evaluation criteria. In some implementations, a user may be able to modify the range of a design variable after the simulation is complete. In a conventional system, specifying a different range for a design variable requires performing another simulation on the geometric representation; however, using the process described in more detail below, the range may be altered and the effect calculated without requiring additional simulations, thereby reducing the overall amount of computer processing power required to modify the design.

Frequently, a designer may have identified many different design variables that can be modified without having a good understanding of which design variables will have a substantial impact on the evaluation criteria. The process may identify the design variables that are more relevant to the evaluation criteria.

The information identifying the areas of the geometry and design can be used to create an altered design 112. In some implementations, the altered design may be determined by a user with access to the results of the simulation. In some implementations, the altered design may be determined automatically by a computer processing system in order to improve the evaluation criteria.

The altered design 112 may be sent to a factory or other manufacturing facility 116. The manufacturing facility may use the altered design 112 to generate a physical tangible prototype or a physical tangible production version of the mechanical device (such as the automobile 116).

Figure 2:
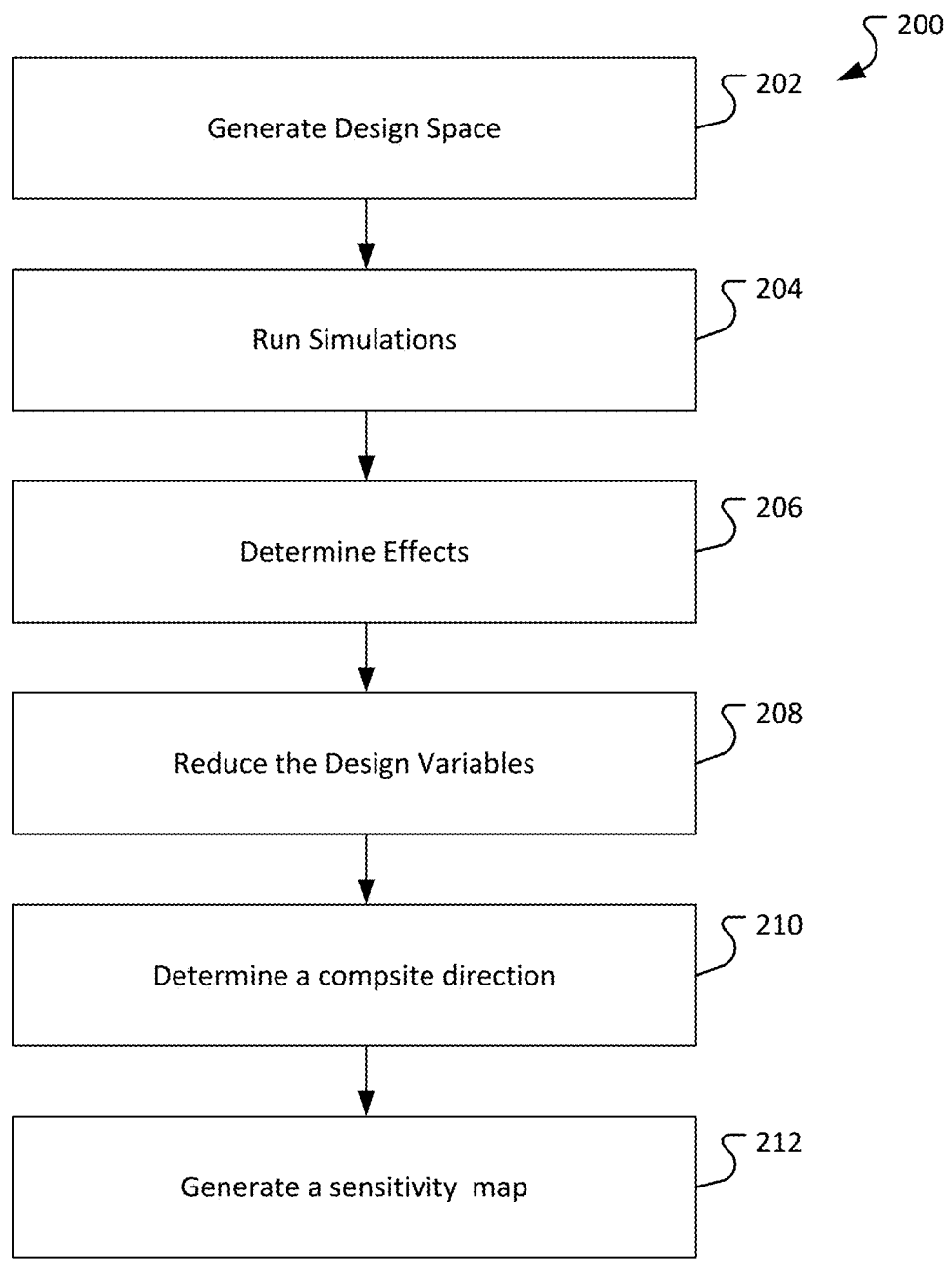
FIG. 2 is a flowchart illustrating an example process for performing computationally efficient simulations.

FIG. 2 is a flowchart illustrating an example process for computationally efficient simulation. The process 200 can be performed by one or more computer systems executing computer instructions stored on a non-transitory medium.

The process 200 includes generating 202 a design space. The design space can be created using a number of design variables and morphing techniques. In some implementations, the design space may be generated using parametric mesh modeling. Mesh modeling represents a design in a computer using geometric shapes (such as polygons). The geometric shapes represent or approximate the surfaces of the design.

The process 200 includes performing 204 simulations for a set of designs. DOE and adaptive sampling can be used to generate simulation runs for a set of designs. The simulations can use Lattice Boltzmann-based physics to accurately predict real world conditions. The simulation can use the complex model geometry of the design space and accurately and efficiently perform aerodynamic, aeroacoustic and thermal management simulations. For each simulation, the evaluation criteria is calculated for quantities of interest such as the drag coefficient, $C_D$, rear lift coefficient CLR, and front lift coefficient CLF.

The process 202 includes determining 206 the effects of the design variables on the evaluation criteria. This effect can be shown using various statistics such as a cross-correlation matrix and using curve fits (such as a Kriging response surface). For some types of analysis (such as scatter plots and Pareto fronts), the Kriging response surfaces for each evaluation criteria can be used to generate a very large set of data for so-called "virtual simulations", where the responses of each virtual simulation is calculated using the response surfaces rather than new simulations.

Kriging or Gaussian process regression is a method of interpolation for which the interpolated values are modeled by a Gaussian process governed by prior covariances, as opposed to a piecewise-polynomial spline chosen to optimize smoothness of the fitted values. Under suitable assumptions on the priors, Kriging can provide the best linear unbiased prediction of the intermediate values. Interpolating methods based on other criteria such as smoothness need not yield the most likely intermediate values. The method is widely used in the domain of spatial analysis and computer experiments. The data coming out of deterministic computer simulations can be interpolated. Kriging can be used as a meta-modeling tool, (a black box model built over a designed set of computer experiments). In many practical engineering problems, such as the design of a metal forming process, a single simulation might be several hours or even a few days long. It can be more efficient to design and run a limited number of computer simulations and then use a Kriging interpolator to rapidly predict the response in any other design point. A response can be, for example, the evaluation criteria described above.

The process 200 can reduce 208 the set of design variables to a set of principal components. Principal Component Analysis (PCA) is one type of statistical analysis that can be performed on the set of simulations or virtual simulations. PCA is a statistical procedure that uses an orthogonal transformation to convert a set of observations of possibly correlated variables into a set of values of linearly uncorrelated principal components. It is based on the cross-correlation matrix, and not on a response surface method. However, it can be used with Kriging response surfaces by utilizing virtual simulations to generate the cross-correlation matrix. PCA attempts to reduce, or map, the design variables into a new set of variables called principal components, which better describe the responses. The significance of each principal component is also computed and can be used to determine the amount of variance in the response that is attributed to that component. By keeping only a limited number of principal components, the design space can be simplified to fewer design attributes (changes to the design, such as roof length) while keeping the desired amount of variation in the resulting responses. Typically, only a few principal components are retained.

While the process is described using principal component analysis, other mechanisms can also be used. For example, the system could use any computation that compares the sensitivity of the evaluation criteria to the variable (such as data regression analysis or a conjugate gradient analysis).

The process 200 determines 210 a composite direction from the principal components. The composite direction can describe a direction determined to be optimal for minimizing an evaluation criteria (for example a primary response variable, such as $C_D$,) in order to create a sensitivity map on the surface showing the geometry change leading to the greatest improvement in the primary response variable.

The process 200 generates 212 a sensitivity map. The sensitivity map is generated by computing the optimal direction for minimizing the response, and then showing this using a surface map colored by normal displacement distance. The normal displacement distance can be computed by morphing along the composite direction, and then computing the normal displacement relative to the unmorphed geometry.

The PCA formulation is described below, showing how the principal components can be calculated. Next, the optimal direction for minimizing a response variable is derived based on the principal components. Finally, the calculation of the sensitivity map using this direction is described.

Design Space

The design space can be defined as morphing which displaces the vertices of a mesh geometry used in the simulation. Morphing features are considered in this formulation to be additive (in this analysis) to create a net displacement using the sum of all the morphs applied to the geometry.

A morphing feature $\vec{M}_i$ is described as:

$$\vec{M}_i = \vec{M}_i(X,Y,Z,F_i) \quad (1),$$

where X, Y, and Z are the 3D coordinates of vertices of the surface mesh geometry, and $F_i$ is the morphing feature value, with user-defined range from $F_{min}$ to $F_{max}$. The design space can include several morphing features, $F_1, F_2, F_3, \ldots, F_N$ which are combined together by summing the displacements, as shown here:

$$\vec{M}_T = \sum_{i=1}^{N} \vec{M}_i. \quad (2)$$

The displacement introduced by morphing can be shown visually on the model, by coloring by the normal displacement distance $M_N$, defined as:

$$M_N = \vec{M}_T \cdot \hat{n}, \text{ where } \hat{n} = \hat{n}(X,Y,Z) \quad (3)$$

$\hat{n}$ is a unit vector normal to the surface at the vertex point X, Y, Z.

In one implementation, for any set of design variables the surface distribution of normal displacement distance $M_N$ can be calculated using a script to perform the computations, as follows:
  apply the morph, combining the design features
  read the unmorphed and morphed mesh files using a script
  compute the total morph displacement vector $$\vec{M}_T = \sum_{i=1}^{N} \vec{M}_i$$

for each vertex point by subtracting the X, Y, Z values of the unmorphed mesh from the morphed mesh
  compute the outward normal unit vector $\hat{n}$ for the point X, Y, Z
  compute the normal displacement distance as the dot product of the displacement vector and the normal vector, $M_N = \vec{M}_T \cdot \hat{n}$.
  visualize the normal displacement distance as a color map from blue to red, where blue is negative (displaced inward) and red is positive (displaced outward).

Because morphs can be assumed to be linear and additive, the amplitude of the morphing change does not change the distribution of the normal displacement (it will only change the range shown in the color map from blue to red).

Principal Component Analysis (PCA)

Designs and Normalized Design Data

The design data from any simulation can include a set of design variables and responses. For morphing features, the design variables $F_1$, $F_2$, etc., are shown in Eq. (1). The normalized design variables and response variables are computed using Eqs. (4) and (5), respectively:

$$f_i = \frac{F_i - \overline{F}_i}{F_{i,max} - F_{i,min}}, \quad (4)$$

for i=1, 2, . . . , M where M is the total number of factors used for this analysis
  and $$r_i = \frac{R_i - \overline{R}_i}{R_{i,max} - R_{i,min}}, \quad (5)$$

for i=1, 2, . . . , P where P is the total number of responses used for this analysis This data can be combined into a row vector representing all the data for any design:

$$\vec{x} = [f_1, f_2, f_3, \ldots, r_1, r_2, r_3, \ldots], \text{ also noted as } x_i,$$
$$i=1,2,3,\ldots,N, \quad (6)$$

where N is the number of design variables plus the number of responses, N=M+P. Note: throughout this document, vector notation $\vec{x}$ will be used interchangeably with subscript notation $x_i$ to represent vectors.

A matrix, or table, of data can be generated representing the design data from a set of K simulations or virtual simulations. This matrix is written:

$$X = \begin{bmatrix} \vec{x}_1 \\ \vec{x}_2 \\ \ldots \\ \vec{x}_K \end{bmatrix}, \quad (7)$$

where $\vec{x}_k = [f_1, f_2, f_3, \ldots, r_1, r_2, r_3, \ldots]_k$, is a row-vector containing the data (centered and normalized) from the $k^{th}$ simulation as described in Eq. (6).

For the analysis described in this example, the matrix of design data (7) can come from either a set of simulations or a set of virtual simulations. If coming from the virtual simulations, the Kriging response surface method can first be used and the resulting principal component analysis can be based on much denser data representing thousands of points across the design space, most likely improving the statistical validity of the results.

Principal Coordinates

PCA is used to produce a new space where the number of variables can be reduced, based on the contribution that each variable produces to the total variation in the design space.

The reduced space is described using a row-vector of length L:

$$\vec{p} = [p_1, p_2, \ldots, p_L], \text{ or } p_i, i=1,2,3,\ldots,L, \text{ and } L<M$$
$$(\text{usually, } L<4) \quad (8)$$

Where $p_i$ are the components in each principal coordinate direction.

The reduce space is connected to the original design space through a set of weight factors $w_{ij}$, as shown below:

$\vec{p} = \vec{x} W$, shown as a vector/matrix multiplication with components as follows: (9)

$p_j = x_i w_{ij}$ with implied summation over $i$, and where $i=1,2,\ldots,j=1,2,\ldots,L$. (10)

Note that interestingly, the principal coordinates represent the variation in both the input and response data.

For any simulation or virtual simulation, Eq. (10) can be used to compute the principal components, once the set of weight factors are determined. It is also of interest to find the principal component vector that describes each design variable or response. This is also computed using Eq. (10). For each factor or response, a row vector $\vec{x}^i$ containing only that column is constructed as:

$\vec{x}^i = [0,0,\ldots,0,f_i,0,\ldots,0]$, if $i<M$, or
$\vec{x}^i = [0,0,\ldots,0,r_{i-M},0,\ldots,0]$ if $i>M$. (11)

Then, using Eq. (10), the principal components vector, $\vec{p}^i$, for that factor or response can be determined as:

$\vec{p}^i = \vec{x}^i W$, or $p^i_n = x^i_m w_{mn}$. (12)

The principal components vector of particular interest is the vector describing the direction of the primary response variable, $r_1$. Assuming that the optimization objective is to minimize $r_1$, the principal direction of reduction of $r_1$ is shown as:

$\vec{p}^{M+1} = \vec{x}^{M+1} W$, where $\vec{x}^{M+1} = [0,0,\ldots,0,r_1,0,\ldots,0]$. (13)

This direction vector in principal coordinates space shows a combination of principal coordinate values $p_1, p_2, p_3, \ldots$ for greatest reduction of $r_1$.

The vector in principal coordinate space, Eq. (13), can be used to compute the combination of design variables, $f_1, f_2, f_3, \ldots$ to reduce $r_1$. The principal coordinate vector for each design variable may have a component in the optimal direction. This component is determined by projecting the vector onto the composite direction:

$$f_i^{opt} = \vec{p}^i \cdot \frac{\vec{p}^{M+1}}{|\vec{p}^{M+1}|}. \quad (14)$$

Eq. (14) produces a subset of design variables, $f_i^{opt}$, for reducing the response Note that this analysis is linear (and is based fundamentally on the correlation matrix between the design and response variables), so the set of optimal design variables can be scaled by an arbitrary scale factor to indicate the amount of design change. Also note that for multiple responses, the same analysis can be used to determine the design features for reducing or increasing each response variable.

Using Eq. (14), the design variables needed to show the optimal direction for improving the design are determined. These design variables are used to create the visualization of normal displacement distance on the 3D surface mesh as described above, representing the sensitivity map for greatest improvement of the design.

Figure 3:
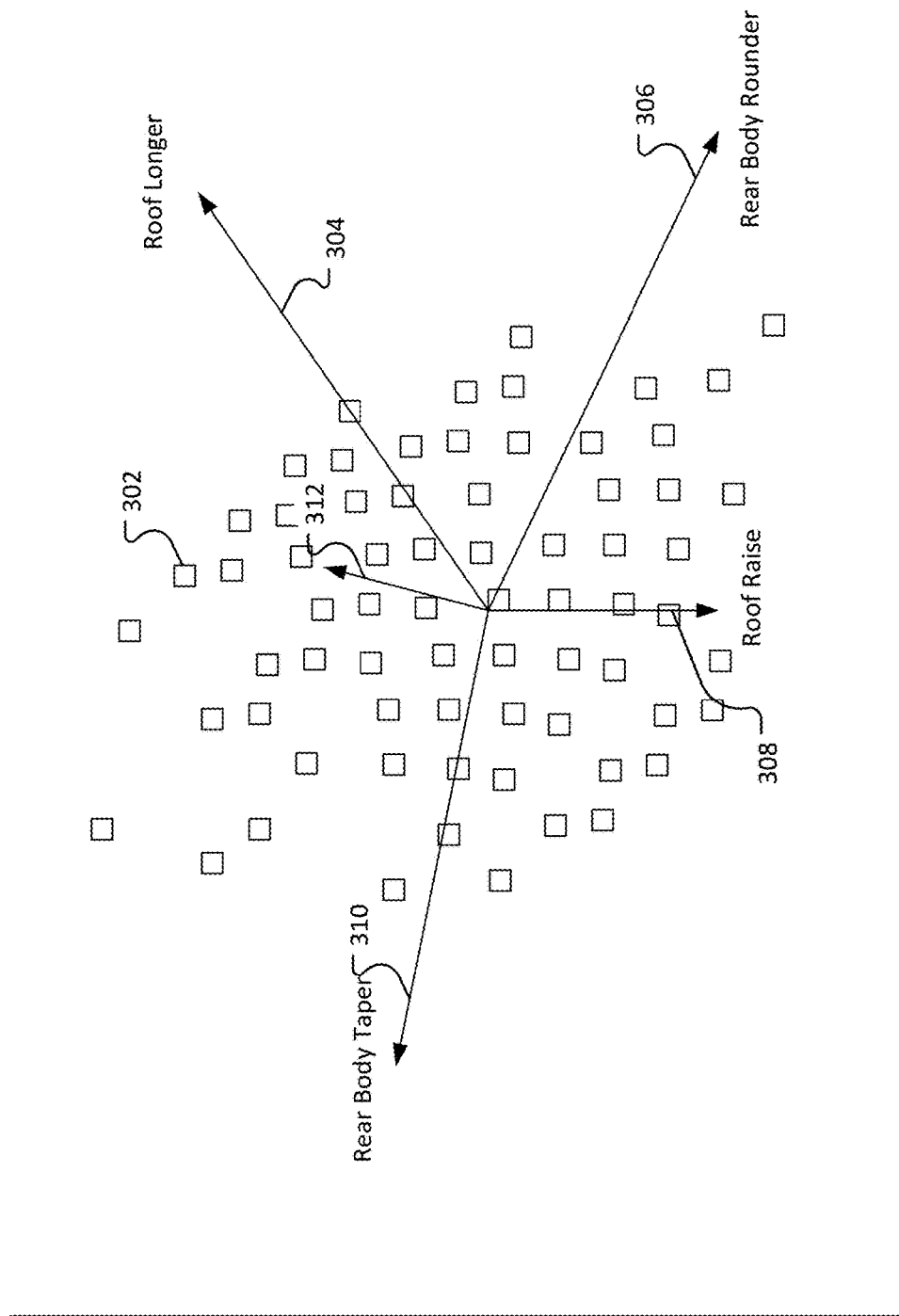
FIG. 3 illustrates an example of direction vector in principal coordinate space.

FIG. 3 illustrates an example of direction vectors in principal coordinate space. The graph 300 shows several design variables (represented by the squares, including representative square 302). Using PCA, as described above several principal coordinate vectors can be determined (such as the rear body taper vector 310, the roof longer vector 304, the rear body rounder vector 306, the roof raise vector 308). The vectors can be combined to generate a composite direction vector 312.

Finally, for any simulation or virtual simulation, a measure of how much that simulation aligns with the optimal direction can be determined as a scalar value, by projecting the vector of design values onto the optimal direction, and summing their contributions. This scalar measure can be called $p^{opt}$, indicating that it is a measure of the distance along a direction of optimal response which is a combination of the other PCA directions:

$$p^{opt} = \sum_{i=1}^{N} f_i \cdot \frac{f_i^{opt}}{|f_i^{opt}|} \text{ uses the subset of design variables} \quad (15)$$

All that remains is to compute the weight factors, as shown in the next section.

Computing PCA Weights using Singular Value Decomposition (SVD)

The weight factors $w_{ij}$ can be computed using the Singular Value Decomposition (SVD) algorithm to decompose the design data matrix, X, shown in Eq. (7)

$X = U\Sigma W^T$, (16)

Where W is the matrix of right singular vectors of X, and the singular values $\sigma_i$ of X are stored on the diagonal of the diagonal matrix $\Sigma$. W provides the needed weights for Eq. (9). The singular values $\sigma_i$ are ordered in order of decreasing value, and shown the amount of variation of the design data represented by each singular vector. Based on this data, the singular vectors with small singular values can be discarded, and only the most significant singular vectors are kept. This selects the number, L, of columns in the weight matrix W, as shown in Eqs. 8-10.

The weights and singular values are related to the eigenvectors and eigenvalues of the correlation matrix of X, as shown:

$X^T X = W\Sigma U^T U\Sigma W^T = W\Sigma^2 W^T = W\Lambda W^T$, (17)

Where W is the matrix of eigenvectors of the correlation matrix $X^T X$, and $\Lambda$ is the diagonal matrix of the eigenvalues of $X^T X$.

The SVD algorithm is applied by linear algebra libraries to compute the weight matrix W along with the singular values $\sigma_i$. From this data, the number of singular values, L, to retain in the analysis is determined, and is equal to the number of principal components.

Organizing the Output Data in a Table

The design and response data for K simulations or virtual simulations are represented as matrix X as shown in Eq. (7). Additional columns of output can be created to represent the PCA analysis, and the data can all be stored in a table with K rows and the following columns:

Table of input and output data for all designs:
Index, k
Design variables, $F_1, F_2, \ldots, F_N$
Response data, $R_1, R_2, \ldots, R_M$
Centered and normalized design variables, $f_1, f_2, \ldots, f_N$, using Eq. (4)
Centered and normalized responses, $r_1, r_2, \ldots, r_M$, using Eq. (5)

Principal coordinate values $p_1, p_2, \ldots, p_L$, using Eq. (10) and the weights computed from the decomposition (16)

Optimal response measure, $p^{opt}$, using Eq. (15)

In addition, the table of weights $w_{ij}$, from Eq. (16) should be shown along with the list of singular values $\sigma_i$, in order for the user to determine the needed number, L, of principal directions to retain in order to represent the overall variation in the design space.

Finally, the design features $f_i^{opt}$, representing the direction of calculated optimal response should be calculated from Eq. (14). Since these values are centered and normalized, they should be rescaled back into the original design range, using (inverting) Eq. (4).

$$F_i^{opt} = \overline{F} + f_i^{opt}(F_{i,max} - F_{i,min}) \quad (18)$$

The design features $F_i^{opt}$ should then be used to generate the sensitivity map.

Visualizing the Sensitivity Map

In order to generate a 3D sensitivity map, the design features $F_i^{opt}$ should be calculated using (18). Using these features, the geometry can be morphed using Eq. (1), and the displacement vector and normal displacement distance should be calculated using Eqs. (2) and (3), respectively. The normal displacement distance, calculated at each vertex, can be visualized on the surface mesh geometry, as described above. The sensitivity map can be colored based on the range of distances represented, and should preferably be centered at zero, with blue indicating displacement "into" the surface, and red indicating displacement "out of" the surface. The "range of applicability" of the sensitivity map should be noted, and will be equal to the range of normal displacements computed in the analysis. This helps the user understand that the analysis does not describe what happens for larger displacements than indicated, as often the analysis can not be extrapolated outside of the design space ranges used in the PCA analysis.

Generalizing the Method for Multiple Response Variables

In general, when addressing multiple response variables, in some implementations, the system can generate a separate composite design vector for each of one or more evaluation criteria in the evaluation criteria. In other implementations, the system can generate a single composite design vector for the combined evaluation criteria. In some implementations, the system may generate both separate composite design vectors and the second composite design vector.

In Eq. (14), the principal component analysis can be used to relate the input design variables to the reduction of one response variable, $r_1$, (which for aerodynamics will often be the drag coefficient, $C_D$). The method can be generalized to other optimization problems involving multiple response variables, multiple objectives, and constraints. As shown above in Eqs. (5)-(12), the analysis already assumes that there are may be multiple response variables, $r_1, r_2, \ldots, r_P$, and these variables are to be included in the SVD analysis leading the PCA weights. In order to represent a more general optimization problem, Eq. (14) can be extended by defining a preferred response direction vector $\vec{R}$, which represents the goal of the optimization problem using the PCA vectors $\vec{p}^1, \vec{p}^2, \ldots, \vec{p}^P$ as shown:

$$\vec{R} = \vec{R}(\vec{p}^1, \vec{p}^2, \ldots, \vec{p}^P) \quad (18)$$

Eq. (19) can represent various types of optimization problems. For minimizing or maximizing one response variable, Eq. (19) can be specified as, for example, Minimize $r_1$:

$$\vec{R} = -\vec{p}^1. \quad (20)$$

Maximize $r_1$:

$$\vec{R} = \vec{p}^1. \quad (21)$$

For joint minimization of two variables with equal weighting, the preferred response direction can be formulated using vector addition as:

Minimize $r_1$ and $r_2$ with equal weight:

$$\vec{R} = -\frac{1}{2}(\vec{p}^1 + \vec{p}^2). \quad (22)$$

Note that $r_1$ and $r_2$ are normalized by the maximum range found in the design space, as shown in Eq. (5), so "equal weight" in this case means relative change, not absolute change.

For constrained optimization using an equality constraint, the preferred design direction can also be described using the principal coordinate vectors. For example, an optimization problem where $r_1$ is minimized while $r_2$ is held constant at its midpoint value in the design space, can be formulated as follows. The preferred design direction can be required to remain constant along the $\vec{p}^2$ direction, by projecting $\vec{p}^1$ onto the plane normal to $\vec{p}^2$ using the dot product:

Minimize $r_1$ while keeping $r_2$ constant:

$$\vec{R} = -\left[\vec{p}^1 - \vec{p}^1 \cdot \frac{\vec{p}^2}{|\vec{p}^2|}\right]. \quad (23)$$

Eq. (23) will find a direction for reducing $r_1$ along the plane of constant $r_2$. Note that this should be considered a soft constraint, since it applies along a statistical representation of the response space based on the correlation matrix. An individual design may or may not follow the general trends and therefore may not enforce the constraint. However, PCA will provide a convenient way to identify a design direction that will seek to maintain the constraint while still optimizing the response.

A vector formula can also be used to find the preferred design direction under an inequality constraint. For example, if $r_1$ is minimized while $r_2 \leq r_{2,max}$, a vector can be found which best satisfies this constraint:

Minimize $r_1$ while $r_2 \leq r_{2,max}$:

$$\vec{R} = \begin{cases} -\left[\vec{p}^1 - \vec{p}^1 \cdot \frac{\vec{p}^{2,max}}{|\vec{p}^{2,max}|}\right], & \text{if } (\vec{p}^1 \cdot \vec{p}^{2,max} > 0) \\ -\vec{p}^1, & \text{if } (\vec{p}^1 \cdot \vec{p}^{2,max} \leq 0) \end{cases} \quad (23)$$

Where $\vec{p}^{2,max}$ is a vector pointing in PCA space to the preferred maximum value of $r_2$. If $\vec{p}^1$ is found to cross the plane represented by the constraint $\vec{p}^{2,max}$, it should be modified to not cross the plane, but to point to a point on that plane.

Representing the design goals using PCA vectors provides a natural framework for expressing more complex optimization problems, using the general notion of a preferred design direction. This preferred design direction can incorporate constraints and multiple objectives.

Note that other types of multi-variate or constrained optimization problems can be formulated in different ways that lead to first modifying the response surface for the design space. For example a constraint can be formulated by adding a Lagrange multiplier as another design variable or by applying a penalty function in the response surface. In these instances, the PCA analysis can be used as described above, using the modified definition of the design space and the resulting response surface. The modified response surface can be sampled at a large number of points to create the design points shown in Eq. (7), and the PCA calculation can proceed as shown.

Conventional methods of generating sensitivity maps are incapable of generating multi-variate sensitivity maps. For example, conventional methods can analyze based on drag or lift but not drag and lift. Instead, each variate must be simulated separately and combined manually. As the system described herein can process multiple variates simultaneously instead of executing multiple simulations (one for each variate), the current system is much more computationally efficient than conventional methods. Further, the ability to simultaneously analyze a design across multiple evaluation criteria provides a substantial enhancement to the design process.

Figure 4:
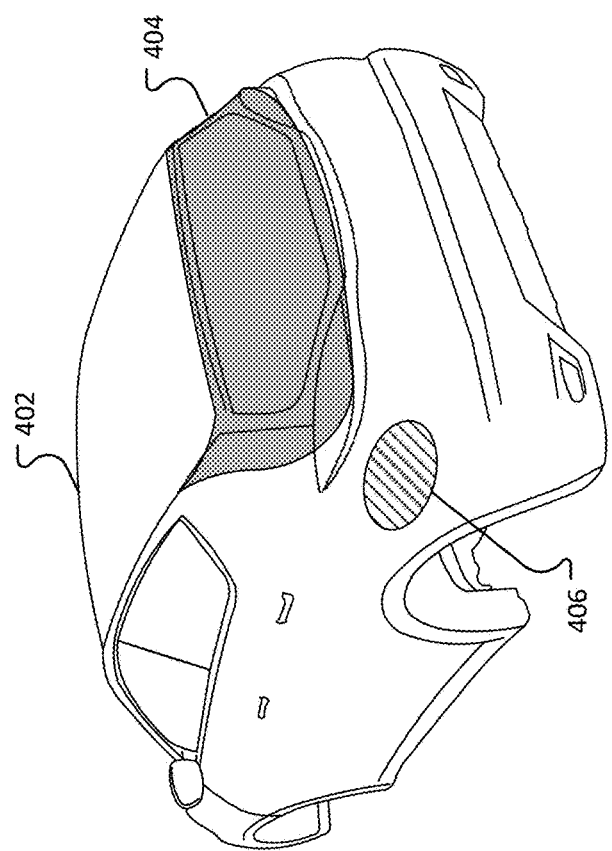
FIG. 4 illustrates an example of a normal displacement distance as a surface map over a full range of the design space.

FIG. 4 illustrates an example of a displacement recommendation of a surface map over a full range of the design space. In this example, the automobile 402 has been analyzed as described above. Principal coordinate vectors have been identified, as well as a composite design direction. The effects of the analysis are presented on the image of the automobile 402. In this example, the shaded area 404 indicates an area of the automobile 402 that should be displaced outward in order to improve the evaluation (or response) criteria (for example, the drag coefficient). The striped area 406 indicates an area of the automobile that should be displaced inward in order to improve the response criteria. This presentation illustrates the effect of displacement across the full range of the design space. For example, utilizing the full amount of displacement that the designer or other individual indicated they were willing to adopt. This visualization provides a substantial improvement over the conventional methods of presenting the results of a design analysis using multiple graphs and spreadsheets. The color coded mesh makes it easy at a glance to digest a large quantity of information.

In some implementations, the image of the automobile 402 can be manipulated in three dimensional space (for example, the image may be rotated.)

Figure 5:
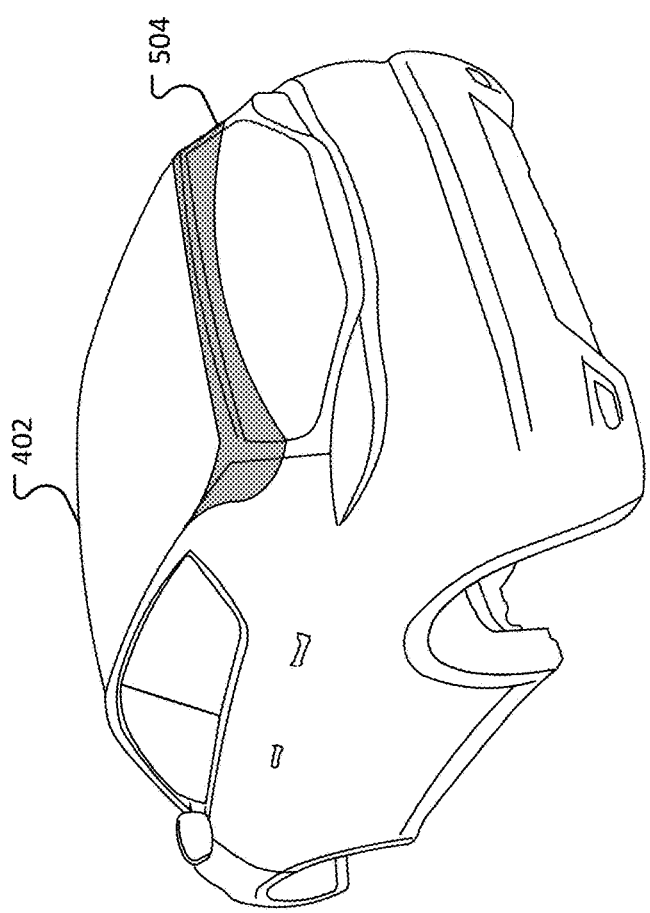
FIG. 5 illustrates an example of a normal displacement distance as a surface map over half the range of the design space.

FIG. 5 illustrates an example of a displacement of a surface map over half the range of the design space. In some scenarios, the designer or other individual may determine that they do not wish to use the full range of the design space. When the range is compressed (in this example, reduced in half). The composite direction can be recalculated. In this example, utilizing half of the available range results in a smaller change recommendation for design alterations to the automobile 402, represented by the shaded area 504. In some scenarios, a user may determine that a particular design variable cannot be changed at all, while some design variables may be modified using the full range.

In this example, the striped area is removed, and the shaded area has become much smaller. In some scenarios, the composite design direction may change entirely (for example, if the user is willing to move the roof 20 cm the best alteration is to extend the roof; however, if the user is only willing to move the roof 10 cm the best alteration is to compress the roof.).

In some implementations, a user may set and/or change the ranges for each design variable in real-time. The system can re-calculate the composite direction for the new ranges and update the display accordingly. For example, the user may interact with a user interface that allows the ranges to be modified.

Using the processes described above, the effect of compressing the available range can be recalculated without performing another simulation. This provides a concrete improvement over the current state to the art. These prior techniques require that new simulations be executed for every change to the design. As the time necessary to perform a simulation using conventional methods can be on the order of a week, the ability to alter design ranges without requiring a new simulation represents a substantial leap in utility and efficiency of computer processing in design analysis.

Conventional surface analysis techniques are inferior to the described system because these techniques are only applicable across a very short range around a starting point (on the order of 1 mm) while the system described herein can provide analysis over a far greater range. This is because the adjoint equations used in conventional techniques are inherently linearized and are thus only valid over a small range of values. The system described herein can provide an analysis for changing a mechanical device regardless as to how much the designer is willing to change the geometry (for example, 10 cm to 40 cm or larger) and therefore provides the ability to determine the effects of a much larger change.

The success of a conventional design analysis is largely dependent on the features that are selected as the design variables. For example, being over inclusive or under inclusive can cause a traditional analysis to provide poor results. In contrast, the system described herein can identify key design variables regardless as to the number of design variables that are presented, thereby providing improved analysis over conventional techniques.

A number of implementations have been described. Nevertheless, it will be understood that various modifications may be made without departing from the spirit and scope of the claims. Accordingly, other implementations are within the scope of the following claims.

What is claimed is:

1. A method for processing data in a data processing system to identify one or more candidate modifications to one or more physical features of a mechanical device by:

converting, using the data processing system, a representation of the mechanical device into a representation of one or more surface elements;

based on the representation of the plurality of surface elements, computing, using the data processing system, an effect on one or more evaluation criteria of the mechanical device of each of a plurality of design variables in a design space, each design variable facilitating an alteration to the design of the mechanical device;

converting, using the data processing system, the design variables and data indicative of the computed effect into vectors;

computing, using the data processing system, a design direction for the one or more evaluation criteria using the vectors, with the design direction comprising a combination of design variable settings to improve the one or more evaluation criteria, and specifying a vector in the design space, wherein the design direction indicates a direction in the design space that points from a starting design towards a local optimum design; and generating, using the data processing system, a physical modification specification for the mechanical device based on the design direction.

2. The method of claim 1, wherein the alteration to the design by each design variable identifies a morphing feature.

3. The method of claim 1, wherein converting the design variables and the calculated effects into vectors comprises performing a principle component analysis.

4. The method of claim 1, wherein the evaluation criteria includes at least one of drag and lift.

5. The method of claim 1, wherein the design alterations are limited by the ranges corresponding to the design variables.

6. The method of claim 1, wherein altering the design includes performing a shape modification using a parameterized morphing technique.

7. The method of claim 1, wherein the morphing features comprise displacements normal to the surface of the design.

8. The method of claim 1, wherein computing the effect of each design variable comprises:
automatically simulating an effect to an evaluation criteria of the mechanical device of each of a plurality design variables over a chosen range;
determining the effect of each design variable based on the simulation; and
creating a response surface of the evaluation criteria for the design based on the simulation.

9. The method of claim 8, further comprising:
altering a range corresponding to at least one design variable; and
re-computing the design direction based on the altered range, without re-simulating fluid flow over the design.

10. The method of claim 1, wherein computing the design direction includes constraints on one or more of the design variables.

11. The method of claim 1, wherein computing the design direction includes weights and/or constraints on one or more of the evaluation criteria.

12. The method of claim 1, wherein computing the design direction comprises computing a separate design direction for each of one or more evaluation criteria in the evaluation criteria.

13. The method of claim 1, wherein computing the design direction comprises computing a single design direction for the combined evaluation criteria.

14. The method of claim 1, wherein the physical modification specification includes proposed modifications to the mechanical device.

15. A computer implemented method for identifying physical modifications of a mechanical device specification by:
determining, using a computer, an effect of each of a plurality of design variables in a design space on one or more evaluation criteria, each design variable facilitating an alteration to the design of the mechanical device;

comparing, using the computer, the importance of the design variables based on the determined effects on the one or more evaluation criteria;
converting, using the computer, the design variables and data indicative of the computed effect into vectors;
computing, using the computer, a design direction for the one or more evaluation criteria using the vectors, with the design direction comprising a combination of design variable settings to increase a performance the one or more evaluation criteria, relative to performance of the one or more evaluation criteria at other design variable settings, and identifying a vector in the design space, wherein the design direction indicates a direction in design space that points from a starting design towards a local optimum design; and
generating, using the computer, a physical modification specification to the mechanical device based on the design direction.

16. The method of claim 15, wherein the alteration to the design by each design variable identifies a morphing feature.

17. The method of claim 15, wherein comparing the importance of the design variables comprises comparing the impact of changes to design variables settings on the one or more evaluation criteria.

18. The method of claim 15, wherein the one or more evaluation criteria includes at least one of drag and lift.

19. The method of claim 15, wherein generating the physical modification specification is limited by a range associated with at least one of the design variables.

20. The method of claim 15, wherein generating a physical modification specification includes performing a shape modification using a parameterized morphing technique.

21. The method of claim 15, wherein the morphing features comprise displacements normal to the surface of the mechanical device.

22. The method of claim 15, wherein determining the effect of each of the plurality of design variables comprises:
simulating fluid flow over the device for each design variable applied over a chosen range;
determining the effect of each design variable based on the simulation; and
creating a response surface of the evaluation criteria based on the simulation.

23. The method of claim 22, further comprising:
altering a range corresponding to at least one design variable; and
re-computing the design direction based on the altered range, without re-simulating fluid flow over the design.

24. The method of claim 15, wherein:
computing the design direction includes constraints on one or more of the design variables.

25. The method of claim 15, wherein computing the design direction comprises at least one of weights and constraints on one or more of the evaluation criteria.

26. The method of claim 15, wherein computing the design direction results in a separate design direction for each of one or more evaluation criteria in the evaluation criteria.

27. The method of claim 15, wherein computing the design direction results in a single design direction for the combined evaluation criteria.

* * * * *

UNITED STATES PATENT AND TRADEMARK OFFICE
CERTIFICATE OF CORRECTION

| | | |
|---|---|---|
| PATENT NO. | : 9,633,165 B1 | Page 1 of 1 |
| APPLICATION NO. | : 15/058398 | |
| DATED | : April 25, 2017 | |
| INVENTOR(S) | : Brad Duncan and Andrea Shestopalov | |

It is certified that error appears in the above-identified patent and that said Letters Patent is hereby corrected as shown below:

On the Title Page

Item (72), first column under Inventors, after inventor "Brad Duncan" please delete "Lexintgon, MA (US)" and replace with --Lexington, MA (US)--.

Signed and Sealed this
Seventh Day of May, 2019

Andrei Iancu
*Director of the United States Patent and Trademark Office*